(12) United States Patent
Sharma

(10) Patent No.: US 8,595,771 B1
(45) Date of Patent: Nov. 26, 2013

(54) SYSTEMS AND METHODS FOR UPDATING THE DISPLAY OF PREFERRED MEDIA ASSET SOURCES

(71) Applicant: United Video Properties, Inc., Santa Clara, CA (US)

(72) Inventor: Priyanka Sharma, Burbank, CA (US)

(73) Assignee: United Video Properties, Inc., Santa Clara, CA (US)

(*) Notice: Subject to any disclaimer, the term of this patent is extended or adjusted under 35 U.S.C. 154(b) by 0 days.

(21) Appl. No.: 13/711,393

(22) Filed: Dec. 11, 2012

(51) Int. Cl.
*H04N 5/445* (2011.01)

(52) U.S. Cl.
USPC ............... 725/52; 725/37; 725/38; 725/39

(58) Field of Classification Search
USPC .......................................................... 725/52
See application file for complete search history.

(56) References Cited

U.S. PATENT DOCUMENTS

| | | | |
|---|---|---|---|
| 5,850,218 A | 12/1998 | LaJoie et al. | |
| 7,036,092 B2 | 4/2006 | Sloo et al. | |
| 7,313,805 B1 * | 12/2007 | Rosin et al. | 725/45 |
| 7,571,453 B2 | 8/2009 | Knudson | |
| 8,024,756 B2 | 9/2011 | Friedlander et al. | |
| 2010/0146555 A1 * | 6/2010 | Komsi | 725/56 |

* cited by examiner

*Primary Examiner* — Robert Hance
(74) *Attorney, Agent, or Firm* — Ropes & Gray LLP

(57) ABSTRACT

System and methods for improving interactive grid displays are presented. When the user equipment receives media asset information related to titles of media assets transmitted from media asset sources, an interactive grid is generated and displayed which contains the media asset information. When the user equipment detects a request from the user to update the time interval on the interactive grid display to a new time interval, only the display of media assets related to the preferred media asset sources may be updated to correspond to the new time interval. The display of media assets related to non-preferred media assets sources may not be updated. In some embodiments, the preferred media asset sources may be visually distinguished from non-preferred media asset sources. In some embodiments, the non-preferred media asset sources may be visually distinguished in response to the user input to update the displayed time interval.

27 Claims, 8 Drawing Sheets

SYSTEMS AND METHODS FOR UPDATING THE DISPLAY OF PREFERRED MEDIA ASSET SOURCES

BACKGROUND

Current media systems allow users to browse media asset information corresponding to media asset sources in interactive grid displays. Typically the interactive grid displays contain time interval information on one axis and media asset sources on a second axis. The second axis of media asset sources may contain preferred media asset sources, for example channels labeled as "favorite" channels. When a user browses the interactive display by changing the time interval in the interactive grid display, typically all of the media asset sources are updated to display new media assets at the new time interval.

However, updating the display of every media asset source can require a large amount of computational resources. The conservation of resources is especially important for mobile systems (e.g., cell phones, tablets, music players, laptops) where resources are scarce. Also, users may only prefer to see media assets for the preferred media asset sources, thus the resources consumed updating the non-preferred media asset sources may not be as beneficial to the user.

SUMMARY

These and other objects are accomplished in accordance with the principles of the present invention by providing enhanced user equipment configured to provide more efficient navigation on interactive grid displays. In one embodiment, the user equipment receives media asset information related to titles of media assets transmitted from media asset sources. An interactive grid is generated and displayed which contains the media asset information. When the user equipment detects a request from the user to update the time interval on the interactive grid display to a new time interval, only the display of media assets related to the preferred media asset sources will be updated to correspond to the new time interval. The display of media assets related to non-preferred media assets are not updated.

In some embodiments, the preferred media assets are visually distinguished from the non-preferred media assets on the interactive grid display. For example, a graphic on the interactive grid display may be used to distinguish the preferred media asset sources from the non-preferred media asset sources.

In some embodiments, the interactive grid display may be configured by the user equipment to display time interval information on a first axis and media asset source information on a second axis. For example these axes may be orthogonal and oriented to the user equipment display.

In some embodiments, the media asset information related to the preferred media assets are displayed on the interactive grid, such that the time interval information is on a first axis and the media asset source information is on a second axis. The media asset information related to the non-preferred media sets are also displayed on the interactive grid display. The display of the media asset information related to the preferred media assets are visually distinguished from the non-preferred media assets. In response to receiving a user response, the user equipment updates the display of the media asset information related to preferred media asset sources at a new time interval, without updating the display of the non-preferred media asset sources. The update of the preferred media asset sources may further involve visually removing the media asset information no longer related to the new time interval and adding new media asset information related to the new time interval for the preferred media asset sources.

In some embodiments, the received media asset information may contain the following information but is not limited to media asset titles, descriptions, images, videos, media asset source information, and sounds.

In some embodiments, the user equipment may be configured to alter the preferred status of media asset sources in response to receiving a user input on the interactive grid display. For example, the user equipment may receive an input from the user to change the preferred status of a media asset source (e.g., NBC) from a non-preferred status to a preferred media asset source.

In some embodiments, the display of the non-preferred media asset sources may be visually distinguished from the preferred media asset sources in response to receiving the user input to change the time interval on the interactive grid. For example, the non-preferred media asset sources may have a different color to indicate that they will not be updated.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION OF EMBODIMENTS

Figure 1:
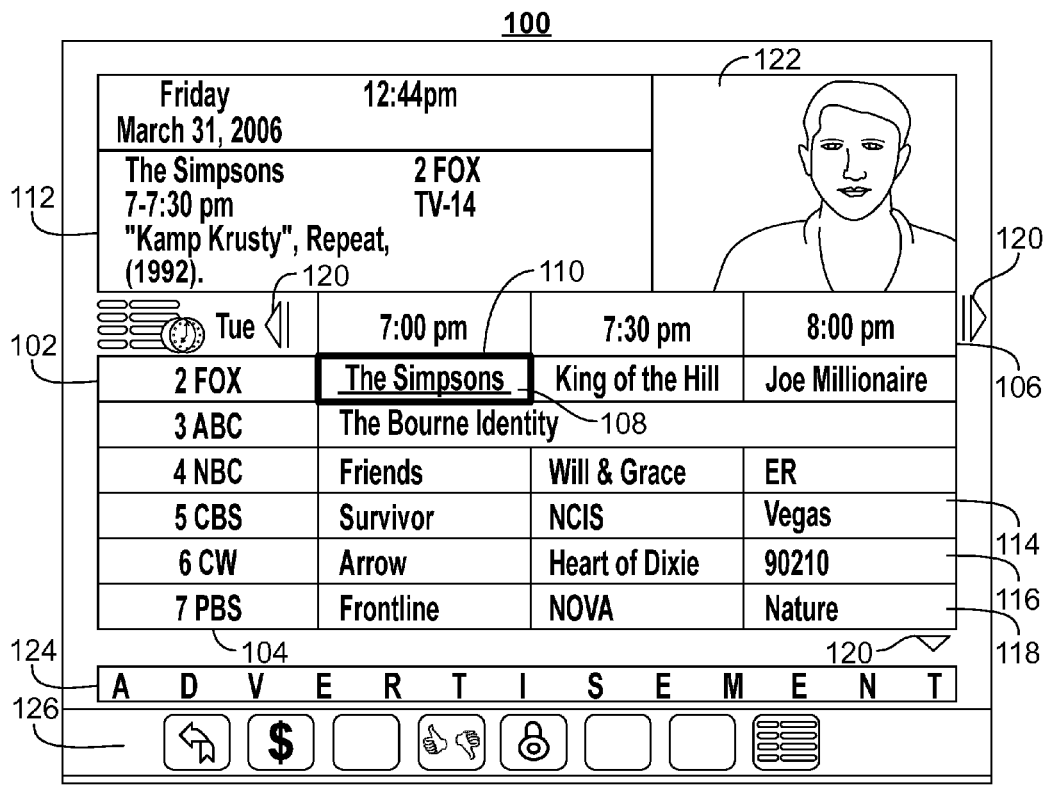
FIG. 1 is a diagram of an interactive grid display in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 1-2 and 5-7 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browser overlay, or other options.

In some embodiments the options region 126 may allow the user to access alternative methods to browse the interactive grid display. Several on-screen options or a dedicated assignable button on a user input device may invoke the alternative methods to browsing. For example, a method to browse favorite channels only may be presented. In this embodiment, when the user chooses to change the time interval on the interactive grid display, only the favorite channels may be updated while the non-favorite channels are not updated. In another embodiment, an option to display only media asset information corresponding to preferred media asset sources may be presented. For example, the interactive grid display may remove the display of non-favorite channels to leave only the favorite channels left to be displayed.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

In some embodiments the content listings in a user profile may contain preferred media asset sources. A preferred media asset source is a media asset source that is differentiated from other media asset sources by a number of potential causes. For example, the preferred media asset sources may be a favorite channel. The preferred media asset sources may be chosen by the user through a user interface. For example, the user may use an options screen to select from a plurality of channels, a favorite channel. In another embodiment, the user may select a preferred media asset source while watching a media asset from the media asset source and selecting an option through a user interface. For example, while watching a program on the broadcast channel NBC, a user may press a designated "favorite" button on the remote control, which would designate the broadcast channel NBC as a favorite channel.

In some embodiments, the preferred media asset source information may be stored in memory. For example, a list of preferred media asset source labels such as "FOX, NBC, CBS, and MTV" may be stored in memory on the user equipment device. Alternatively, the preferred media asset source label list may be stored on a remote server. For example, the list of preferred media asset sources may be stored at the content provider's location.

In some embodiments, the preferred media asset sources may be selected as preferred media asset sources without user input. For example, certain media asset sources with a certain number of viewers may be defined as preferred media asset sources. In some embodiments a media content provider may determine a media asset source is preferred based upon the number of viewers. For example, if a media content provider determines NBC has 4 million viewers, then NBC will be labeled as a favorite channel. In some embodiments, the media content provider may transmit the number of viewers to a user equipment device. The user equipment device may then allow the user to choose the number of viewers required to define a media asset source as a preferred media asset source. For example, the user may request that any broadcast channel which averages more than 3 million viewers during a certain time frame be automatically designated as a favorite channel by the user equipment device's processing circuitry. The value of 3 million viewers may be adjusted based on user discretion.

In some embodiments, the preferred media asset sources may be selected as preferred media asset sources based on social networking information. A user's profile on a user equipment device may be connected to a social network via the internet, (e.g., facebook, myspace, msn, g+) and the information from the social networks (e.g., friends list, previous media assets watched, media assets commented on) may be used to select media asset sources to be preferred media asset sources. For example, if a user's profile is connected to facebook and a significant number of friends have "liked" a particular media asset source, then the media asset source may be defined as a preferred media asset source. In another embodiment, the media asset sources themselves may have social network profiles of their own, and if a user is "friends" with a media asset source's social network profile, then the media asset source is automatically defined as a preferred media asset source by the user equipment device's processing circuitry.

In some embodiments the preferred media asset sources may be defined as a preferred media asset source based on other user profiles in the personalized guidance application. Several user profiles may be defined in the user equipment device, and if one user profile selects a media asset source as a preferred media asset source, then the same selections may be applied to one or more users. For example, within a family household each person has their own user profile in the processing circuitry, then if one person in the family selects a channel to be a favorite channel, then all of the family members may also have the channel be automatically selected as a favorite channel in each of the other family member's profiles by the user equipment device's processing circuitry.

In some embodiments, the preferred media asset source may be selected as a preferred media asset source based on how long a user consumes a particular media asset source. The user equipment device's processing circuitry may contain a clock which monitors the length of time a user watches each media asset source. For example, if a user watches "CBS" for more than 2 hours a day, the processing circuitry may define "CBS" as a preferred media asset source. The length of time to qualify a media asset source as a preferred media asset source may be a predefined value stored in memory, or it may be a user defined value. In some embodiments, the preferred media asset source may be selected as a preferred media asset source based on how often a user consumes a particular media asset source. For example, if the user watches CBS 6 times a day, then CBS will be automatically selected as a preferred media asset source by the user equipment device's processing circuitry.

In some embodiments, the preferred media asset source may be defined as a preferred media asset source based on the news (e.g., online magazines, online newspapers, online articles, online blogs, online social media). For example, if a particular media asset source is mentioned a specific number of times a month in the news, then the media asset source is sent to the user equipment device to define the media asset source as a preferred media asset source. In some embodiments, the preferred media asset is selected based on the number of awards a media asset source has received. The number of awards may be obtained from the news or some other online database. For example, if the broadcast channel FOX has won more Emmy's than any other broadcast channel, then processing circuitry 306 will receive the number of awards received by FOX and other media asset sources, determine FOX won the most of any other broadcast channel, and label FOX as a preferred media asset.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 2:
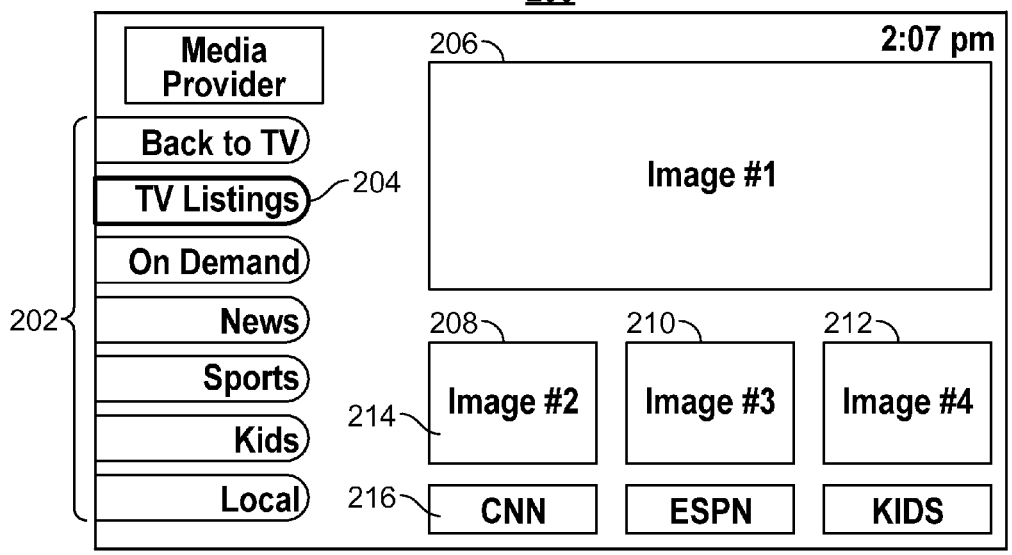
FIG. 2 is a diagram of an interactive media system in accordance with some embodiments of the disclosure.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
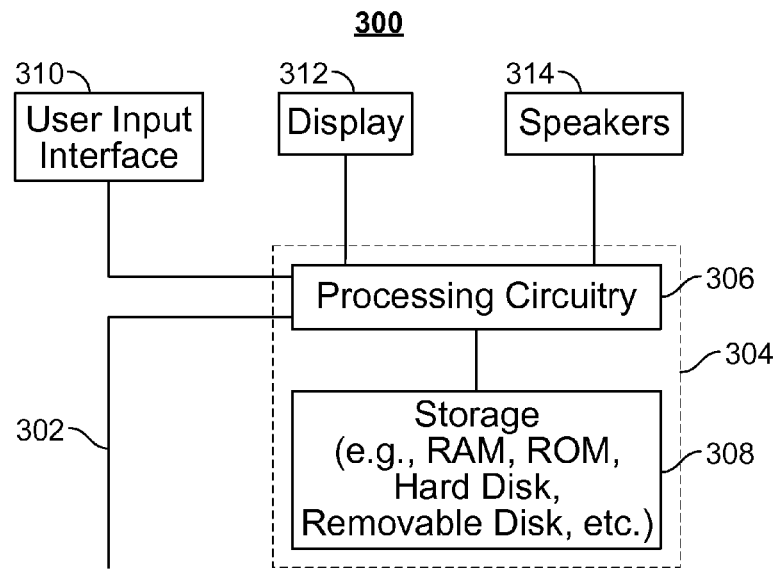
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
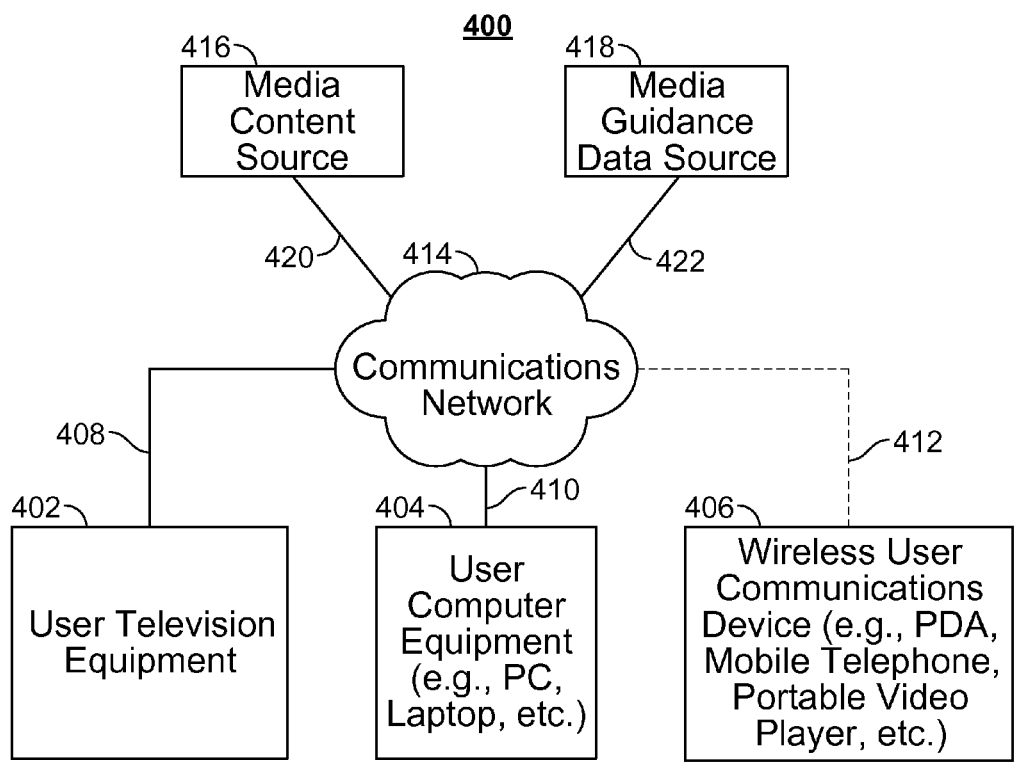
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web-site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, guidance data may include media asset information. Media asset information may contain information related to media assets, for example media asset sources, titles, or descriptions. For example, the media asset information may contain labels of media asset sources (e.g., NBC, ABC, FOX) as well as the titles of media assets scheduled to be transmitted from these sources (e.g., "Seinfeld,"

"Simpsons") and their corresponding descriptions. The media asset information may also contain images or videos of the media asset. For example, images of the media asset (e.g., logo, cast picture, or screenshot) as well as video of the media asset (e.g., video clips, highlights, or previews) may be contained in the media asset information. The media asset information may be visually displayed in program information region 112 by processing circuitry 306.

In some embodiments, the media asset information may be transmitted from the media guidance data source 418, through the communications network 414, and into the user equipment device 402, 404, or 406. Media asset information may be downloaded and received by the processing circuitry 306. The media asset information may be downloaded in response to a user input received from the user input interface 310. For example, the processing circuitry may receive a user request to download media asset information and in response to the user request the media asset information will be downloaded into processing circuitry 306. In some embodiments, the processing circuitry may receive the media asset information periodically without user input. For example, media asset information may be transferred through an I/O port 302 into the processing circuitry 306 once every hour without user input. In some embodiments, the processing circuitry may receive the media asset information continuously without user input. For example, new media asset information may be continuously received at processing circuitry 302 in order to constantly update the media asset information at the user equipment device.

In some embodiments, the downloaded media asset information may relate to a certain time interval. For example, the media asset information downloaded by the processing circuitry may only contain information on media assets scheduled to be received between the hours of 12:00 PM and 6:00 PM.

In some embodiments, the media asset information may contain information related to preferred media asset sources. The media asset information may contain information labeling certain media asset sources as preferred media asset sources. For example, the media asset information may contain a list of preferred media asset sources from which the processing circuitry 306 may use to designate preferred media asset sources. In some embodiments, the encoded information of the media asset source may contain information related to preferred media assets. For example, in the encoded bit stream of the media asset source information labeled "FOX", a section of the bit stream may be used to identify "FOX" as a preferred media asset source. The method of selecting the preferred media asset sources may be performed as similarly described above.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user equipment devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and BULU, which provide audio and video via IP packets. YouTube is a trademark owned by Google Inc., Netflix is a trademark owned by Netflix Inc., and Bulu is a trademark owned by Bulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user equipment device may receive content from multiple cloud resources simultaneously. For example, a user equipment device can stream audio from one cloud resource while downloading content from a second cloud resource. Or a user equipment device can download content from multiple cloud resources for more efficient downloading. In some embodiments, user equipment devices can use cloud resources for processing operations such as the processing operations performed by processing circuitry described in relation to FIG. 3.

In some embodiments, the user may want to distinguish, on the display screen, the preferred media asset sources from the non-preferred media asset sources. The distinguishing features may be a visual indicator on the display screen. In some embodiments, the distinguishing feature may be a non visual indicator (e.g., auditory signal, physical vibration). The distinguishing feature may occur in response to a user signal.

Figure 5:
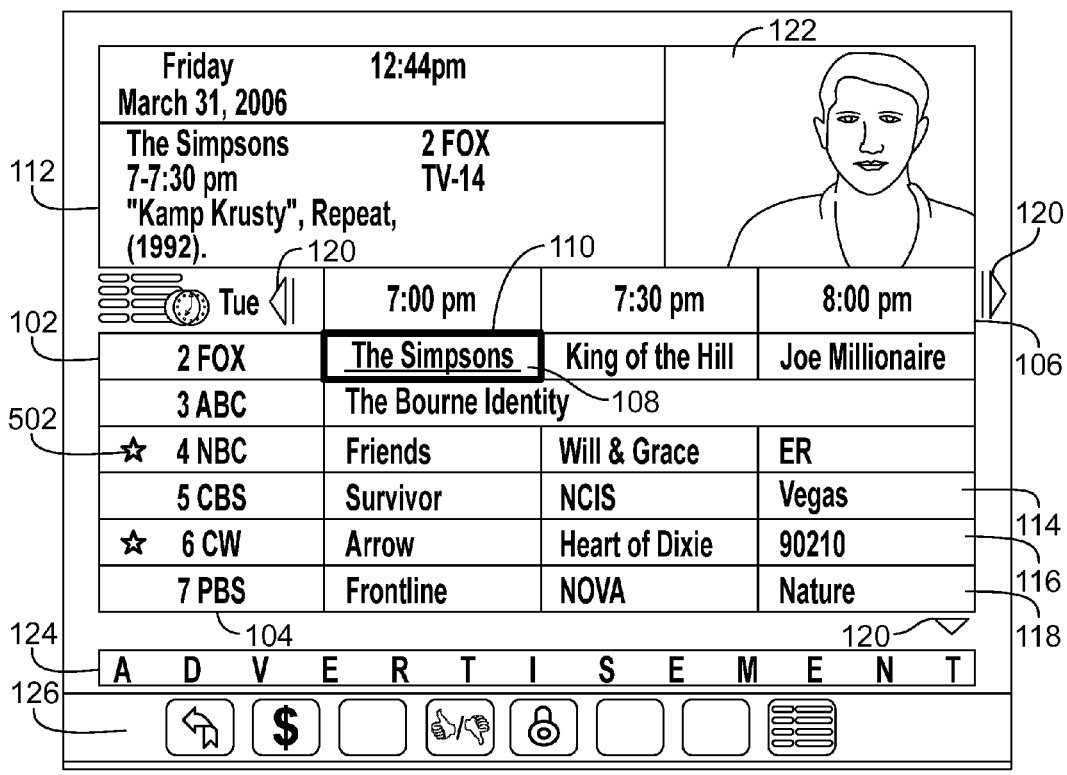
FIG. 5 shows a diagram of an interactive grid display with visually distinguishing graphics to indicate the preferred media asset sources in accordance with some embodiments of the disclosure.

FIG. 5 shows preferred media asset sources may be visually distinguished from non-preferred media asset sources on the illustrative display screen 500, in accordance with some embodiments of the disclosure. The display screen 500 may be similar to the display screen 100 as described above. However, the display screen 500 includes a star icon 502 next to certain media asset sources to indicate that media asset sources NBC and CW are preferred media asset sources. The preferred media asset sources may be visually distinguished by processing circuitry 306 from the non-preferred media asset sources by a variety of other methods but are not limited to background color, border color, text color, and icons.

In some embodiments, the illustrative display screen 500 may be an interactive grid display with the time interval information on a first axis and the media asset sources on a second axis. Each of the media asset's information may be displayed such that the media asset information is aligned by both the first and second axis based on the corresponding time of transmission and the media asset source from which the media asset information is related to. In some embodiments, user equipment device 300 may allow each media asset on the interactive grid display to be selectable by the user. In some embodiments, the user equipment device 300 may allow the media asset sources on the interactive grid display to be selectable by the user. For example, highlight region 110 may be used to select the media asset source "FOX" 102 on the interactive grid display.

In some embodiments, the preferred media assets related to the preferred media asset sources are visually distinguished on the interactive grid display by the user equipment device 300 in response to a user input. The user input may be transmitted from the user input interface 310. For example, one of the options on the user input interface 310 may be to "Display favorites," from which processing circuitry 306 may be signaled to generate graphical indicators to distinguish the preferred media asset sources on the interactive grid display.

In some embodiments, the preferred media assets related to the preferred media asset sources are visually distinguished on the interactive grid display in response to a selection on the interactive grid display. The user equipment device 300 may display an option in the option region 126 which allows the user to visually distinguish the media assets related to the preferred media asset sources on the interactive grid display. For example, a "display favorites" option with a graphic of a star may be in option region 126. When the user highlights and selects the "display favorites" option, the processing circuitry 306 generates a graphic of star 502 to be displayed next to the favorite channel on the interactive grid display. If the "display favorites" option is highlighted and selected while the star 502 is currently displayed, then the processing circuitry 306 removes the graphic of star 502 and the favorite channel is no longer visually distinguished on the interactive grid display.

In some embodiments, the preferred media asset sources are automatically visually distinguished in response to a user selection of the preferred media asset source. For example, in response to a user defining a media asset source as a preferred media asset source through a number of methods, as mentioned above, the user equipment device 300 will automatically visually distinguish the preferred media asset on the interactive grid display 500. In response to a user removing the definition of a preferred media asset source, the user equipment device 300 will automatically not visually distinguish the preferred media asset in the interactive grid display 500.

In some embodiments, the method of visually distinguishing preferred media asset sources may depend on the method at which the media asset was defined as preferred. As mentioned above, a media asset may be preferred based on, but are not limited to, user inputs, secondary user inputs, audience ratings, news, or awards. Each of these methods may cause the user equipment device 300 to generate a different indicator on the interactive grid display. For example, with user defined preferred media asset sources, a graphical icon of a star may be presented, as shown in FIG. 5. However, if a media asset source was defined as a preferred media asset source through an audience rating system, then the background color of the media asset source on the interactive grid display may change colors. As an alternative example, if a second user, different from the current first user, defines a media asset source as a preferred media asset source on the user equipment device 300, then on the interactive grid display the initials of the second user may be generated by processing circuitry 306.

In some embodiments, user equipment device 300 may allow the user to select which visually distinguishing method to use from a plurality of visually distinguishing methods. For example, the processing circuitry 306 may provide an option in the option region 126 to change the method of distinguishing the preferred media asset. In some embodiments the user may use the second screen device mentioned above to select a method of distinguishing the preferred media assets. For example, the second screen device may display a plurality of visual indicators for the user to select from in order to distinguish the preferred media asset sources. In response to a user selection, the selected visual indicator is transmitted to control circuitry 304 to change the visual indicator on the interactive grid display.

In some embodiments, user equipment device 300 may signal an auditory signal to distinguish the preferred media asset sources. For example, when the user moves highlight region 110 to a preferred media asset source on the interactive grid display, the processing circuitry detects that the highlight region is selecting a preferred media asset source and emits an audio signal to the speakers 314. The audio signal may be one of a number of audio signals (e.g., constant tone, musical melody, or a recording of a spoken message). In some embodiments both an audio signal and a visually distinguishing feature are used to distinguish the preferred media asset sources. For example, a star icon next to the preferred media asset source may be displayed on the interactive grid display by processing circuitry 306, and when a user moves highlight region 110 to the preferred media asset source, the processing circuitry 306 plays an audio signal from speakers 314.

In some embodiments, the preferred media asset sources are visually distinguished on the second screen device. The second screen device, as described above, may be used to display the preferred media assets. For example, in response to a request to update the time interval of the display of the preferred media asset sources by control circuitry 304, the processing circuitry 306 may transmit commands and media asset information to the second screen device. The second screen device may then display only the media asset information related to preferred media asset sources while the media asset information related to the other media asset sources are displayed on the first display.

In some embodiments, the preferred media asset sources are visually distinguished by the font style. The font type (e.g., italics, bold, font-face) of the preferred media asset sources on the interactive grid display may be used for the preferred media assets. For example, the preferred media asset sources may be in font "Arial" and in bold while the other media asset sources may be in font "Times New Roman."

In some embodiments, the preferred media asset sources are visually distinguished in a 3D display. For example, the preferred media asset source NBC may be displayed by processing circuitry 306 at a different depth compared to the other media asset sources so as to appear closer to the user on the 3D display. The other media asset sources may appear further away from the user in order to visually distinguish the 3D display of the preferred media assets sources.

In some embodiments, the preferred media asset sources are visually distinguished by a graphical animation. For example, the display of the preferred media asset source FOX by the processing circuitry 306 may include an animation in which the label FOX periodically glows on the interactive grid display. The animation may be a separate graphic entirely from the display of the preferred media asset source.

In some embodiments, the preferred media asset sources are visually distinguished by a physical vibration on the user input interface. For example, when a user moves highlight region 110 over a preferred media asset source, the processing circuitry 306 may cause the user input interface 310 to physically vibrate to indicate the selected media asset source is a preferred media asset source.

In some embodiments, the user may want to update the time interval information on the interactive grid display for only the preferred media asset sources. In response to a user request received by the user device, the interactive display may update the display of media asset information related to preferred media asset sources while the display of the media asset information related to the non-preferred media asset sources is not updated. In some embodiments, the display of the media asset information related to the non-preferred media asset sources may be visually distinguished from the display of the media asset information related to the preferred media asset sources. The user request may be generated from a number of user interface devices (e.g., remote control, gesture input interface, voice activated control device). Alternatively, in some embodiments, a second screen device may be used to distinguish the media asset information related to the preferred media asset sources.

Figure 6:
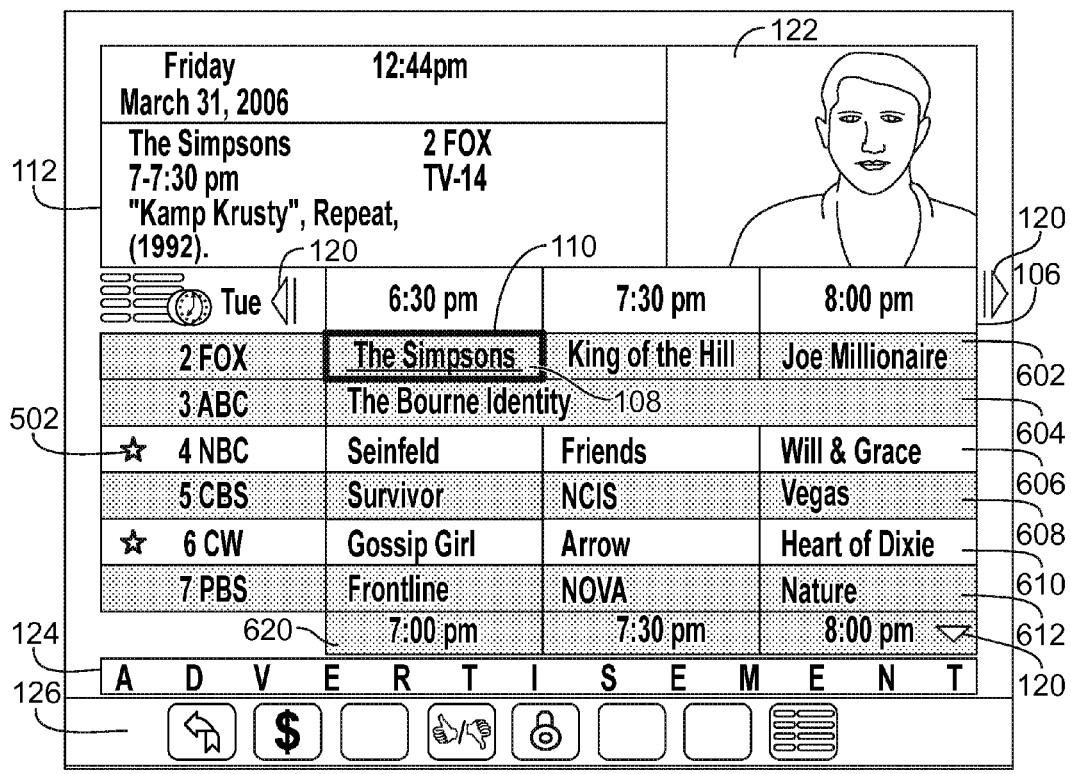
FIG. 6 shows a diagram of an interactive grid display with the media asset information related to preferred media asset sources updated to a new time interval, while the media asset information related to the non-preferred media asset sources is visually distinguished and is not updated in accordance with some embodiments of the disclosure.

FIG. 6 shows the updated interactive grid display with the new time intervals 106 of the media asset information related to the preferred media asset sources as a result of receiving a user request, in accordance with some embodiments of the disclosure. A user request may be received from the user input interface 310 at the processing circuitry 306 to update the display of the preferred media asset sources. To update the display, the processing circuitry 306 may retrieve media asset information related to a new time interval from memory storage 308. The media asset information retrieved from memory storage 308 may then be displayed on the interactive grid display. For example, a user request to update the interactive grid display forward in time by a half hour may be received by the processing circuitry 306. In response to the user request, the media asset information related to the media assets scheduled to be transmitted in the next half hour may be retrieved from memory storage 308. The processing circuitry 306 then displays the retrieved media asset information on the interactive grid display in the corresponding time interval slots. In some embodiments, in response to the user request, the media asset information related to preferred media asset sources scheduled to be transmitted in the future time interval may be retrieved from an external source. For example, the media asset information may be retrieved from the media content source 416 or the media guidance data source 418 through the communications network 414.

In response to the user request to update the display of the media asset information related to the preferred media asset sources, the non-preferred media asset information 602, 604, 608, and 612 are visually distinguished from the media asset information related to the preferred media asset sources, and correspond to the previous time intervals 620. The method of visually distinguishing the non-preferred media asset information may include icons, text color changes, background color changes, or visual removal of the media asset information related to the non-preferred sources from the interactive grid display. Processing circuitry 306 displays the previous time interval before the receipt of the user request on the row of time intervals 620 to indicate the time at which the media assets related to the non-preferred media assets are scheduled to be received. Processing circuitry 306 does not update the time interval of the non-preferred media asset sources in response to the user input.

The processing circuitry 306 updates the row of time intervals 106 in response to the user request to reflect the updated time interval for the preferred media asset sources. The preferred media asset sources 606 and 610 are updated to display the media assets at the new time intervals indicated in the row of time intervals 106. For example, the preferred media assets sources are shifted to the right to first display the new media assets "Seinfeld" and "Gossip Girl" and second, to remove the media assets that are out of the new time intervals, "Will & Grace" and "Heart of Dixie."

In some embodiments, the user equipment device 300 may receive a user request from the user input interface 310 to change the time interval for the preferred media asset sources on the interactive grid display 600. For example, the user may use a remote control with a specified "favorite scan forward" button. When the "favorite scan forward" button is pressed, a signal is sent to the processing circuitry 306 to update the time interval forward in time for the preferred media asset sources. When the "favorite scan backwards" button is pressed, a signal is sent to the processing circuitry 306 to update the time interval backwards in time for the preferred media asset sources. For both cases, processing circuitry 306 may not update the displayed time interval for the non-preferred media asset sources.

In some embodiments, the time interval steps used to update the display of the preferred media assets may be a predefined value. The time interval step may be stored in memory storage 308. For example, when the "favorite scan forward" button is pressed, the time interval step is retrieved from memory storage 308 and is added to the latest time interval in display 106 to generate the display of the future time interval. In some embodiments, the processing circuitry 306 may allow the user to change the time interval step stored in memory storage 308. For example, the user may update the value of the time interval step in memory to one hour. As a result, when the user presses the "favorite scan forward" button, the time interval on the interactive grid display is updated by processing circuitry 306 to one hour ahead. In some embodiments the time interval step may be based on the length of time a user signals the update to occur. For example, if the user presses down on a remote control button to update the time interval of the preferred media asset sources on the interactive grid display, processing circuitry 306 may set the time interval step to a half hour during the first 2 seconds. If the remote control button remains pressed, the processing circuitry 306 may then set the time interval step to an hour.

In some embodiments, a gesture user input interface may be used to change the time interval for the preferred media asset sources on the interactive grid display 600. Gesture input devices may be used to receive 3D images or videos of the user (e.g., XBOX Kinect). Upon the detection of a hand swipe in a specific direction, the gesture input device may signal the processing circuitry 306 to update the displayed time interval of the preferred media asset sources in a direction corresponding to the hand gesture. For example, if the hand gesture swipes left, then the time interval on the interactive grid display for the preferred media asset sources is updated forward in time. Alternatively, for hand gesture swipes right, the time interval on the interactive grid display for the preferred media asset sources is updated by processing circuitry 306 backwards in time.

In some embodiments, the time identifiers 620 are visually distinguished from the preferred media asset sources. The time identifiers 620 may be similarly visually distinguished as the non-preferred media asset sources 602, 604, 608, and 612. For example, in FIG. 6 both the time identifiers 620 and the non-preferred media asset sources have a gray shading overlaid on top of the identifiers and media asset labels. Alternatively, the time identifiers 620 may be visually distinguished from both the preferred and non-preferred media asset sources. For example, the preferred media asset sources are displayed by processing circuitry 306 with no distinguishing features, the non-preferred media assets are displayed by processing circuitry 306 with a gray shading overlay, and the time identifiers 620 may display a background color change by processing circuitry 306.

In some embodiments, the preferred media asset sources are updated on the second screen device screen, while the non-preferred media asset sources are not updated by processing circuitry 306 on the first display screen. For example, the display of media assets related to preferred media assets may be displayed on the second screen device screen. In response to a user input, the second screen device screen may update the time interval of the displayed preferred media asset sources. The display of the non-preferred media asset sources on the first display is not updated. In some embodiments, the user input on the second screen device screen may be a physical hand gesture. For example, if the second screen device screen is a touch-sensitive table (e.g., ipad, nook, smart phone) then when the user swipes to the left the display of the preferred media asset sources is updated forward in time. If the user swipes to the right, then the display of the preferred media asset sources is updated backwards in time.

In some embodiments, the updated display of the preferred media asset sources is displayed on the second screen device while the non-updated display of both preferred and non-preferred media asset sources are displayed on display 312. For example, the processing circuitry 306 may display the interactive display grid on display 312 which contains both the preferred media asset source "NBC" and the non preferred media asset source "CBS". The second screen device may display a number of options to view the media asset information. A first option on the second screen device may be to browse through preferred media assets on the second screen device at a new time interval. If a user selects an option on the second screen device, the request signal is then transmitted to control circuitry 304 from the second screen device for further processing via a number of transmission options (e.g., wifi, Bluetooth, infrared, electrical wire, optical, radio). In response to a user selecting the first option, the second screen device may receive the media asset information related to the preferred media asset source from control circuitry 304. The data may be transmitted a number of ways to the second screen device from control circuitry 304 as described above. Once the data is received, the second screen device may display the preferred media asset information related to the preferred media asset source "NBC" at the new time interval. Meanwhile, display 312 displays both the preferred media asset source "NBC" and the non-preferred media asset source "CBS" at the previous time interval.

In some embodiments, the media assets related to the preferred media asset sources which are not scheduled to be transmitted in the updated time interval are displayed in an alternate representation. For example, in FIG. 6, when the interactive grid display is updated from display screen 500 to display screen 600 the media assets "ER" and "90210" are no longer scheduled to be transmitted during the displayed time interval. In response to the update, the media assets "ER" and "90210" may be displayed in a smaller representation on the grid. Alternatively, the media assets "ER" and "90210" may be displayed by processing circuitry 306 outside of the interactive grid display.

The user input interface 310 may be a voice activated control device which allows the user to update the display of the time interval of the preferred media asset sources. For example, the voice activated control device may listen for the phrase "scan favorite channels forward" from the user. The voice activated control device may process the voice command and transmit the data to control circuitry 304 via a number of transmissions options (e.g., Bluetooth, wifi, infrared, radio, optical, electrical wire). In response to the voice command, the processing circuitry 306 may update the display of the preferred media asset sources forward in time on display 312. Similarly, the voice activated control may listen for the phrase "scan favorite channels backwards" from the user. In response to the voice command, the processing circuitry 306 may update the display of the preferred media asset sources backwards in time.

In some embodiments, user equipment device 300 may allow the user to select an option to update the time interval of preferred media asset sources in response to a user input to update all media asset sources. For example, the options region 126 may provide an option to the user to update only the display of the preferred media asset sources when a user input to scan all channels is received. If the user selects this option, when the "scan right" signal is received from the user input interface 310, only the display of the preferred media asset sources will be updated. In some embodiments the option to update the time interval of preferred media asset sources in response to a user input may be received from a voice activated user input device. For example, if the user states the command "scan favorites only," and subsequently states "scan left," then only the display of the preferred media asset sources will be updated on user equipment 300 via various transmission methods described above. If the command "scan favorites only" wasnot stated, then the command "scan left" may cause the display of all of the media asset sources to be updated on user equipment 300.

In some embodiments, the processing circuitry may allow the user to modify the preferred status of a media asset source on the interactive grid. Alternatively, in some embodiments, a user input interface may provide an option to modify the preferred status of media asset sources (e.g., remote control, gesture input interface, second screen device).

Figure 7:
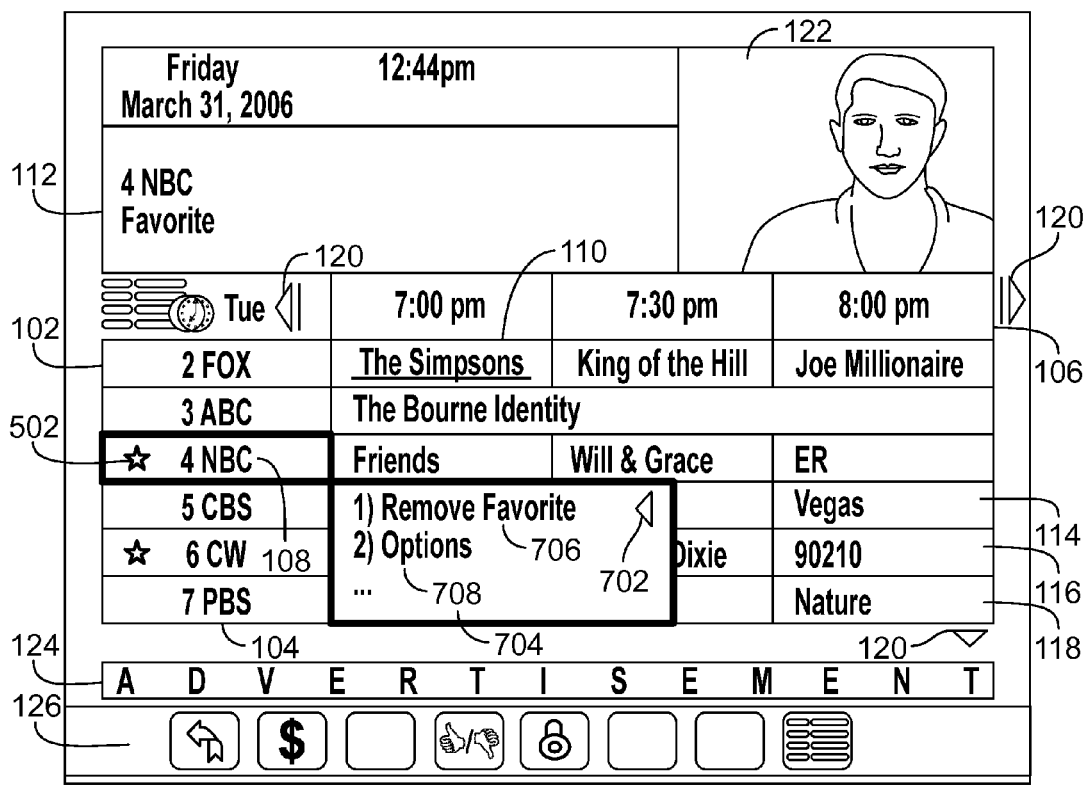
FIG. 7 shows a diagram of an interactive grid display with the option to change the preferred status of a media asset source on the interactive grid display in accordance with some embodiments of the disclosure.

FIG. 7 shows menu 704 on the interactive grid from which a user may remove the preferred status of the media asset source 108 by selecting option 706 in response to selecting media asset source 502 in accordance with some embodiments of the disclosure. The graphical icon 702 indicates which option is currently selected. Several alternate options to be applied to the selected media asset source may be listed in option 708. Similarly, if the selected media asset source is not a preferred source, the menu 704 may display, via processing circuitry 306, an option allowing the user to add the preferred status to the selected media asset source. Menu 704 may appear after the user selects a media asset source by processing circuitry 306.

In some embodiments, a dedicated input on the user input interface 310 may toggle the preferred status of selected media asset sources. For example, after selecting a non-preferred media asset source 108, a user may press a "favorite" button on a remote control device, thus toggling the status of the media asset source from non-preferred to preferred. Similarly, if the selected media asset is already a preferred media asset, the user may toggle the status of the selected preferred media asset to non-preferred in user equipment device 300.

In some embodiments, the preferred status of a selected media asset source may be toggled in response to a voice activated control device. For example, while a user selects a non-preferred media asset source the user may state the phrase "add to favorites," in which case the voice activated control device will signal to the processing circuitry 306 to designate the currently selected media asset source to be a preferred media asset source. Alternatively, in some embodiments, the voice activated control device may allow the user to select the media asset source with a voice command and change the preferred status of the selected media asset source. For example, a user may state the phrase "select NBC, add to favorites," which would first be processed by the voice activated control device into computer commands. The computer commands are then transmitted to the processing circuitry 306 to select NBC to be a preferred media asset source.

A gesture user input device may be used to change the preferred status of a selected media asset source. For example, while a non-preferred media asset source is selected on the interactive grid display, the gesture user input device may allow the user make a specific hand gesture at the gesture user input device, e.g., a first or an open palm. This gesture would be computed by the gesture user input device and converted to a computer command. The computer command is then sent to the processing circuitry 306 to select the selected media asset source as a preferred media asset source. Alternatively, if a preferred media asset source is selected on the interactive grid display, the gesture user input device may allow the user to make a specific hand gesture at the gesture user input device. The gesture is then computed and sent to the processing circuitry 306 to change the preferred status of the preferred media asset source to non-preferred media asset source.

Alternatively, in some embodiments, the options screen 704 may be displayed on the second screen device described above. For example, a non-preferred media asset source may be selected on the interactive grid display. The selection is transmitted from control circuitry 304 to the second screen device via a number of transmission methods described above. On the second screen device, an options menu appears in response to the selection of the non-preferred media asset source to change the preferred status of the selected media asset source. If the user selects the option to change the status of the non-preferred media asset source to a preferred media asset source, then the request is transmitted to control circuitry 304 to change the preferred status of the selected media asset source.

In some embodiments, an iterative process may be used to retrieve and update the media asset information related to preferred media asset sources on the interactive display grid. If the retrieved media asset information is not related to a preferred media asset source, then the display of the media asset information is not updated.

Figure 8A:
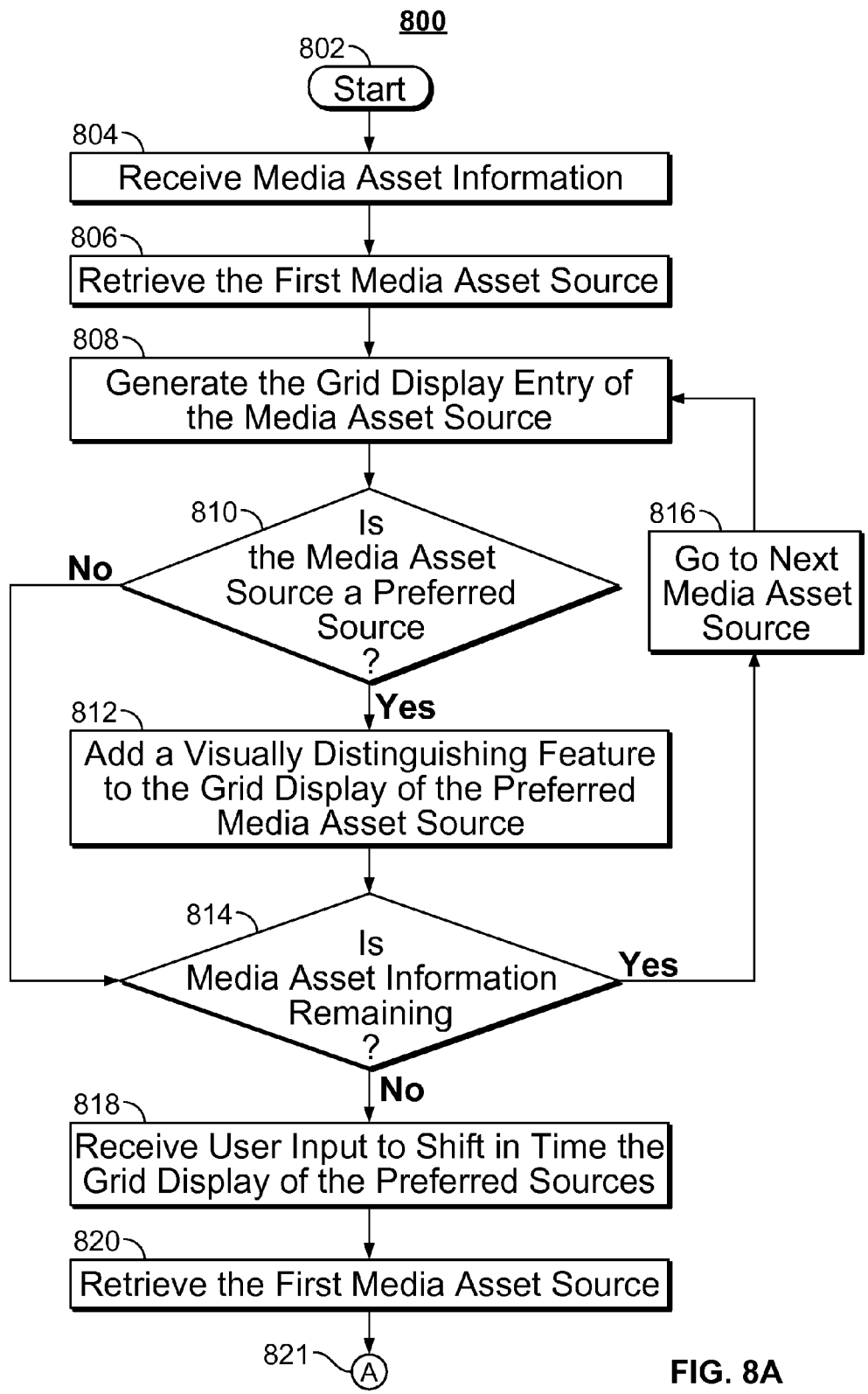
FIG. 8A-B is a flow-chart of the illustrative steps involved in generating the display of the interactive grid and updating only the media asset information related to preferred media assets in accordance with some embodiments of the disclosure.
Figure 8B:
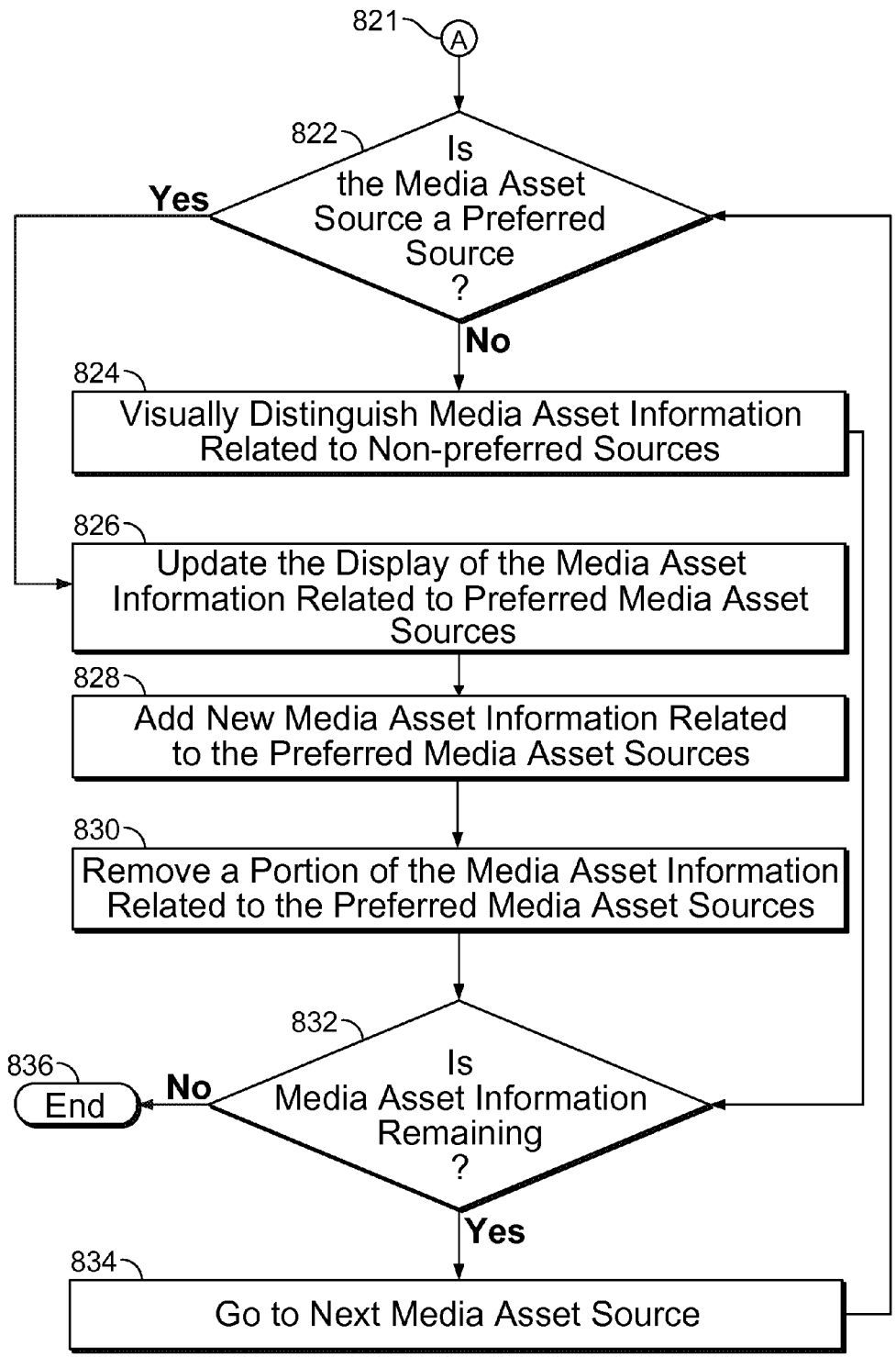

FIGS. 8A-B shows illustrative process 800 for updating media asset information for preferred media asset sources on the interactive grid display in accordance with some embodiments of the disclosure. At step 802 the process may begin in a number of ways. For example, the processing circuitry 306 may receive a command to display the interactive grid from the user which causes the media asset information to be received by the processing circuitry 306. The processing circuitry may also begin the process periodically or continuously without user input. For example, while a user may be browsing the interactive grid, the processing circuitry may receive new or updated media asset information from media content source 416 and begin the process in order to update the information on the interactive grid. Once the process begins, the processing circuitry receives media asset information at step 804 from media content source 416.

The received media asset information may be stored in a buffer in storage 308. An iterative process to generate the grid display one media asset source at a time begins at step 806, where the first media asset source is retrieved from the media asset information. For example, the media asset information may contain a plurality of media asset sources (e.g., FOX, ABC, NBC, and CBS) and their corresponding media asset information (e.g., titles), and at step 806 media asset source FOX is first selected. The display of the selected media asset source and its corresponding media asset information is generated at step 808. The generated display may be similar to the grid 102 in FIG. 1. The generated display may appear on display 312, or a second screen device screen. For example, the entire row 102 for FOX is first generated and displayed on display 312.

At step 810, the processing circuitry determines that the selected media asset source is a preferred media asset source. A media asset source may be determined to be a preferred media asset source if the label of the media asset source matches the label of a media asset source in a preferred media asset sources list. For example, if FOX is the selected media asset source, and in the preferred media asset sources list the media asset source FOX is listed, then processing circuitry 306 will determine that the media asset source FOX is a preferred media asset source. Once the selected media asset source is determined to be a preferred media asset source then at step 812 the processing circuitry may add a visually distinguishing feature, such as star 502 in FIG. 5, to the interactive grid display to the selected media asset source at step 812 and continue to step 814. However, if at step810, the processing circuitry 306 determines that the selected media asset source is not a preferred media asset source, the process continues to step 814. Similarly, if the label of the selected media asset source is not contained in the list of preferred media asset sources, then processing circuitry 306 may determine the selected media asset source to be a non-preferred media asset source. The list of preferred media asset sources may be stored in storage 308.

If, at step 814, there are media asset sources remaining to be processed from the received media asset information 804, the next media asset source is selected at step 816. The selected next media asset source may be implemented by a counter in processing circuitry 306 that increments to select the next media asset source in the received media asset information. After the next media asset source is selected, the process may return to step 808 to repeat the process for the selected media asset source. If, at step 814, there are no remaining media asset sources to be processed, then the display of the interactive grid is complete. At step 818, the processing circuitry receives a user input to update the display to a new time interval on the interactive grid display for only the preferred sources. The user input may be received from the user input interface 310. For example, on a user remote control a "scan favorites" button may be designated to only scan a user's favorite channels, or as similarly described above.

Once the user input is received, the first media asset source from the received media asset information is retrieved at step 820. If, at step 822, the retrieved media asset source is a preferred media asset source, then the display of the media asset information related to the retrieved media asset source is updated to a new time interval at step 826. The time interval may be a predetermined time interval (e.g., half an hour, an hour) or it may depend on the user input (e.g., length of time the scan button is held down, a user selected time interval) as mentioned above. After the grid is updated, new media assets to be transmitted during the new time interval are added to the interactive grid at step 828. Media assets no longer scheduled to be transmitted during the updated time interval are removed from the interactive grid at step 830. If, at step 822, the retrieved media asset source is not a preferred media asset source, then, at step 824, the media asset information displayed on the interactive grid display related to the retrieved media asset source is visually distinguished on the interactive grid. For example, FIG. 5 shows the non-preferred channels are different shading than the preferred channels.

If, at step 832, there remains media asset sources from the received media asset information to be processed, then, at step 834, the next media asset source is selected. The selected next media asset source may be implemented by an incremented counter to select the next entry in the received media asset information. After the next media asset source is selected, the process returns to step 822 to process the selected media asset source. If, at step 832, there are no remaining media asset sources to be processed, then the process is complete and ends at step 836.

In some embodiments, a process for the user to alter the preferred status of media asset sources, as in FIG. 7, may be used by control circuitry 304.

Figure 9:
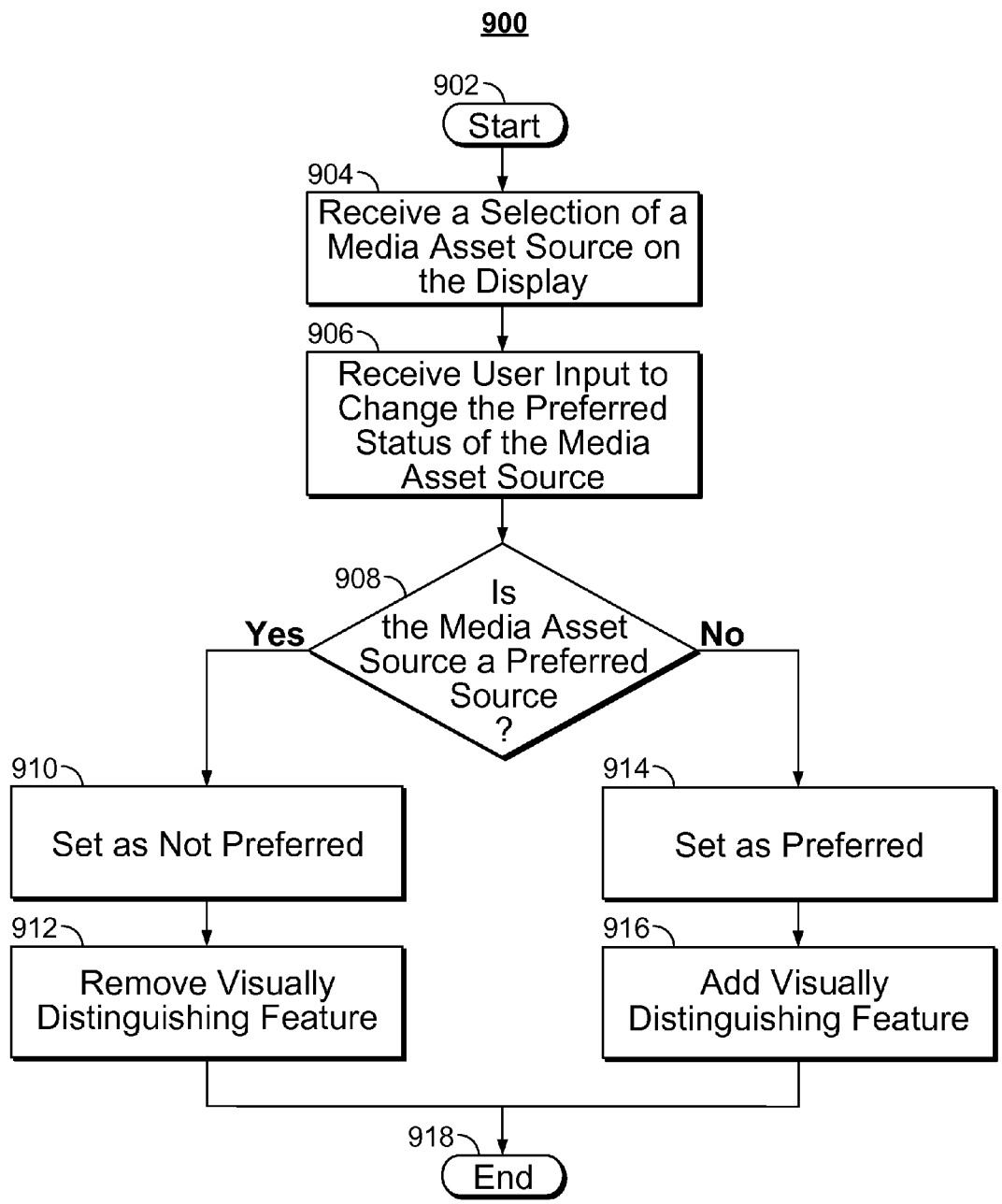
FIG. 9 is a flow-chart of the illustrative steps involved in altering the state of the preferred status of media asset sources in accordance with some embodiments of the disclosure.

FIG. 9 shows the process for changing the preferred status of a media asset source using the interactive grid in accordance with some embodiments of the disclosure. At step 902, the process may begin in a number of ways. For example, the processing circuitry can continuously listen for a particular kind of user input from the user input interface 310 and begin process 900 when the command is received. At step 904, the processing circuitry receives a selection of a media asset source on the interactive grid. For example, the user may highlight a media asset source and signal on the user input interface 310 a submit command, thus transmitting to the processing circuitry 306 the particular media asset source that was selected by the user. At step 906 the processing circuitry receives a user input to change the preferred status of the selected media asset source on the interactive grid. The change of preferred status can be implemented in a number of ways, as described in FIG. 7. The signal received by the processing circuitry can also be represented in a number of ways. For example, the signal can contain information related to either one of the two states "preferred" or "not preferred." In some embodiments the received signal can contain information to only a single "toggle" command. Once the "toggle" command is received, the control circuitry changes the preferred status of the channel, from "preferred" to "not preferred" and vice versa. The toggle command requires less memory than the signals that contain both the "preferred" or "not preferred" information, thus allowing for more efficient computations.

If, at step 908, the selected media asset source is a preferred media assert source, then, at step 910, the media asset source status is set to not preferred. The visually distinguishing feature related to the preferred media asset source is also removed from the interactive grid at step 912. The removal of the visually distinguishing feature may involve a number of methods. Some embodiments may involve but are not limited to the distinguishing feature fading away, graphically moving away, or dissolving away on the interactive grid display. If, at step 908, the selected media asset source is not a preferred media asset source, then, at step 914, the media asset source status is set to preferred. At step 916, a visually distinguishing feature related to the preferred media asset source is added to the interactive grid. The addition of the visually distinguishing feature may involve a number of methods. Some embodiments may involve, but are not limited, to the distinguishing features fading in, graphically moving in, or dissolving in on the interactive grid display. Once the processing circuitry has reached either state 912 or 916, the process concludes at step 918.

It should be understood that the above steps of the flow diagrams of FIGS. 8A-B and 9 may be executed or performed in any order or sequence not limited to the order and sequence shown and described in the figures. Also, some of the above steps of the flow diagrams of FIGS. 8A-B and 9 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for presenting media asset information on user equipment, the method comprising:

receiving, at the user equipment, media asset information related to a plurality of media asset sources, the media asset information including a plurality of titles of media assets transmitted from the plurality of media asset sources and time intervals during which each of the media assets is scheduled for transmission from a respective one of the media asset sources, wherein a first of the plurality of media asset sources is a media asset source preferred by the user;

generating, at the user equipment, an interactive grid display that includes a portion of the media asset information corresponding to a first time interval during which the corresponding media assets are scheduled for transmission from the media asset sources;

receiving, at the user equipment, a user request to change the time interval for which the media asset information is included in the interactive grid; and updating, in response to the user request, the media asset information in the interactive grid display related to the first media asset source to correspond to a second time interval during which the corresponding media assets are scheduled for transmission from the first media asset source without modifying the media asset information in interactive grid display related to any other media asset source, wherein the interactive grid display comprises the plurality of media asset sources in a first geometric direction and time interval information in a second geometric direction.

2. The method of claim 1 wherein the interactive grid display visually distinguishes the first of the plurality of media asset sources from any other media asset source.

3. The method of claim 1 further comprising:

displaying a first of the plurality of media asset titles transmitted from the first of the plurality of media asset sources along the second geometric direction, wherein each of the media asset titles from the first of the plurality of media asset titles are aligned to the corresponding first media asset source in the first geometric direction and aligned to the corresponding time interval in the second geometric direction;

displaying a second of the plurality of media asset titles transmitted from the any other media asset source along the second geometric direction, wherein each of the media asset titles from the second of the plurality of media asset titles are aligned to a corresponding any other media asset source in the first geometric direction and aligned to the corresponding time interval in the second geometric direction;

distinguishing, on the interactive grid display, the graphic display of the first of the plurality of media asset titles from the graphic display of the second of the plurality of the media asset titles;

shifting, in response to the user request, the first of the plurality of media assets titles along the second geometric direction without shifting the second of the plurality of media asset titles; and removing, in response to the shifting, a portion of the first of the plurality of media asset titles and adding new media asset titles to the first of the plurality of media asset titles.

4. The method of claim 1 wherein the media asset information further comprises at least one of a description of the media asset, an image of the media asset, video of the media asset, and media asset source information.

5. The method of claim 1 wherein the media asset sources are media broadcast channels.

6. The method of claim 1 further comprising receiving user input selecting, using the interactive grid display, at least a plurality of media asset sources to be preferred media asset sources.

7. The method of claim 1 wherein the updating the media asset information in the interactive grid display includes graphically shifting the display of the media asset information related to the first media asset source in a first geometric direction to reveal on the display the updated media asset information without modifying the display of the media asset information related to the rest of the media asset sources.

8. The method of claim 1 wherein the updating the media asset information in the interactive grid display includes graphically adding new media asset information to the display of the media asset information related to the first media asset source and removing from the display a portion of the media asset information related to the first media asset source without modifying the display of the media asset information related to the rest of the media asset sources.

9. The method of claim 1 further comprising visually distinguishing, in response to the user request, the first of the plurality of media asset sources from any other media asset source on the interactive grid display.

10. A system for presenting media asset information, the system comprising:
control circuitry configured to:
receive media asset information related to a plurality of media asset sources, the media asset information including a plurality of titles of media assets transmitted from the plurality of media asset sources and time intervals during which each of the media assets is scheduled for transmission from a respective one of the media asset sources, wherein a first of the plurality of media asset sources is a media asset source preferred by the user;
generate an interactive grid display that includes a portion of the media asset information corresponding to a first time interval during which the corresponding media assets are scheduled for transmission from the media asset sources;
receive a user request to change the time interval for which the media asset information is included in the interactive grid; and
update, in response to the user request, the media asset information in the interactive grid display related to the first media asset source to correspond to a second time interval during which the corresponding media assets are scheduled for transmission from the first media asset source without modifying the media asset information in interactive grid display related to any other media asset source,
wherein the interactive grid display comprises the plurality of media asset sources in a first geometric direction and time interval information in a second geometric direction.

11. The system of claim 10 wherein the interactive grid display visually distinguishes the first of the plurality of media asset sources from any other media asset source.

12. The system of claim 10 wherein the control circuitry is further configured to:
display a first of the plurality of media asset titles transmitted from the first of the plurality of media asset sources along the second geometric direction, wherein each of the media asset titles from the first of the plurality of media asset titles are aligned to the corresponding first media asset source in the first geometric direction and aligned to the corresponding time interval in the second geometric direction;
display a second of the plurality of media asset titles transmitted from the any other media asset source along the second geometric direction, wherein each of the media asset titles from the second of the plurality of media asset titles are aligned to a corresponding any other media asset source in the first geometric direction and aligned to the corresponding time interval in the second geometric direction;
distinguish, on the interactive grid display, the graphic display of the first of the plurality of media asset titles from the graphic display of the second of the plurality of the media asset titles;
shift, in response to the user request, the first of the plurality of media assets titles along the second geometric direction without shifting the second of the plurality of media asset titles; and
remove, in response to the shift, a portion of the first of the plurality of media asset titles and adding new media asset titles to the first of the plurality of media asset titles.

13. The system of claim 10 wherein the media asset information further comprises at least one of a description of the media asset, an image of the media asset, video of the media asset, and media asset source information.

14. The system of claim 10 wherein the media asset sources are media broadcast channels.

15. The system of claim 10 wherein the control circuitry is further configured to:
receive a user selection, using the interactive grid display, of at least a plurality of media asset sources to be preferred media asset sources.

16. The system of claim 10 wherein the control circuitry is further configured to update the media asset information in the interactive grid display by graphically shifting the display of the media asset information related to the first media asset source in a first geometric direction to reveal on the display the updated media asset information without modifying the display of the media asset information related to the rest of the media asset sources.

17. The system of claim 10 wherein the control circuitry is further configured to update the media asset information in the interactive grid display by graphically adding new media asset information to the display of the media asset information related to the first media asset source and removing from the display a portion of the media asset information related to the first media asset source without modifying the display of the media asset information related to the rest of the media asset sources.

18. The system of claim 10 wherein the control circuitry is further configured to visually distinguish, in response to the user request, the first of the plurality of media asset sources from any other media asset source on the interactive grid display.

19. A system for presenting media asset information, comprising:
means for receiving, at a user equipment, media asset information related to a plurality of media asset sources, the media asset information including a plurality of titles of media assets transmitted from the plurality of media asset sources and time intervals during which each of the media assets is scheduled for transmission from a respective one of the media asset sources, wherein a first of the plurality of media asset sources is a media asset source preferred by the user;
means for generating, at the user equipment, an interactive grid display that includes a portion of the media asset information corresponding to a first time interval during which the corresponding media assets are scheduled for transmission from the media asset sources;

means for receiving, at the user equipment, a user request to change the time interval for which the media asset information is included in the interactive grid; and means for updating, in response to the user request, the media asset information in the interactive grid display related to the first media asset source to correspond to a second time interval during which the corresponding media assets are scheduled for transmission from the first media asset source without modifying the media asset information in interactive grid display related to any other media asset source, wherein the interactive grid display comprises the plurality of media asset sources in a first geometric direction and time interval information in a second geometric direction.

20. The system of claim 19 wherein the interactive grid display visually distinguishes the first of the plurality of media asset sources from any other media asset source.

21. The system of claim 19 further comprising:

means for displaying a first of the plurality of media asset titles transmitted from the first of the plurality of media asset sources along the second geometric direction, wherein each of the media asset titles from the first of the plurality of media asset titles are aligned to the corresponding first media asset source in the first geometric direction and aligned to the corresponding time interval in the second geometric direction;

means for displaying a second of the plurality of media asset titles transmitted from the any other media asset source along the second geometric direction, wherein each of the media asset titles from the second of the plurality of media asset titles are aligned to a corresponding any other media asset source in the first geometric direction and aligned to the corresponding time interval in the second geometric direction;

means for distinguishing, on the interactive grid display, the graphic display of the first of the plurality of media asset titles from the graphic display of the second of the plurality of the media asset titles;

means for shifting, in response to the user request, the first of the plurality of media assets titles along the second geometric direction without shifting the second of the plurality of media asset titles; and means for removing, in response to the shifting, a portion of the first of the plurality of media asset titles and adding new media asset titles to the first of the plurality of media asset titles.

22. The system of claim 19 wherein the media asset information further comprises at least one of a description of the media asset, an image of the media asset, video of the media asset, and media asset source information.

23. The system of claim 19 wherein the media asset sources are media broadcast channels.

24. The system of claim 19 further comprising:

means for receiving a user selection, using the interactive grid display, of at least a plurality of media asset sources to be preferred media asset sources.

25. The system of claim 19 wherein the means for updating the media asset information in the interactive grid display includes means for graphically shifting the display of the media asset information related to the first media asset source in a first geometric direction to reveal on the display the updated media asset information without modifying the display of the media asset information related to the rest of the media asset sources.

26. The system of claim 19 wherein the means for updating of the media asset information in the interactive grid display includes means for graphically adding new media asset information to the display of the media asset information related to the first media asset source and removing from the display a portion of the media asset information related to the first media asset source without modifying the display of the media asset information related to the rest of the media asset sources.

27. The system of claim 19 further comprising means for visually distinguishing, in response to the user request, the first of the plurality of media asset sources from any other media asset source on the interactive grid display.

* * * * *